(12) United States Patent  (10) Patent No.: US 7,648,035 B2
Edwards et al.  (45) Date of Patent: Jan. 19, 2010

(54) STORAGE RACK FOR GLASS SHEETS

(75) Inventors: Mitchel D. Edwards, Monroe, MI (US); John M. Plevyak, Bloomsburg, PA (US); Odene E. Campbell, Danville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 635 days.

(21) Appl. No.: 11/085,246

(22) Filed: Mar. 22, 2005

(65) Prior Publication Data

US 2006/0213846 A1 Sep. 28, 2006

(51) Int. Cl.
A47G 19/08 (2006.01)
(52) U.S. Cl. .................................................. 211/41.14
(58) Field of Classification Search .............. 211/41.14, 211/41.1, 41.15, 13.1, 71.01, 71, 1; 49/410; 248/345.1, 615; 206/477, 478, 486; 52/631, 52/214, 204.597, 204.69, 204.71, 716.8, 52/717.03
See application file for complete search history.

(56) References Cited

U.S. PATENT DOCUMENTS

| | | | | |
|---|---|---|---|---|
| 1,903,541 A * | 4/1933 | Bailey | ............... | 428/102 |
| 2,954,310 A * | 9/1960 | Truesdell et al. | ............. | 428/122 |
| 3,451,169 A * | 6/1969 | Bell et al. | ............... | 49/462 |
| 3,545,157 A * | 12/1970 | Treber et al. | ............... | 52/718.01 |
| 3,682,083 A * | 8/1972 | Puente | ............... | 396/654 |
| 3,706,173 A * | 12/1972 | Taylor | ............... | 52/717.03 |
| 4,489,519 A * | 12/1984 | Adell | ............... | 49/462 |
| 4,742,916 A * | 5/1988 | Galea | ............... | 206/586 |
| 4,749,203 A * | 6/1988 | Bright | ............... | 277/642 |
| 4,899,880 A * | 2/1990 | Carter | ............... | 206/448 |
| 5,193,692 A * | 3/1993 | Farley et al. | ............... | 211/41.14 |
| 5,207,027 A * | 5/1993 | Larsen | ............... | 49/482.1 |
| 5,439,716 A | 8/1995 | Larsen | | |
| 5,440,857 A * | 8/1995 | Shanok et al. | ............... | 52/716.8 |
| 5,813,536 A | 9/1998 | Bartholomew | | |
| 5,827,058 A * | 10/1998 | Kelly et al. | ............... | 433/9 |
| 5,906,282 A * | 5/1999 | Aldrich et al. | ............... | 211/41.14 |
| 5,950,817 A * | 9/1999 | Iwamoto et al. | ............... | 206/204 |
| 6,025,047 A * | 2/2000 | Catta et al. | ............... | 428/99 |
| 6,102,206 A * | 8/2000 | Pride | ............... | 206/454 |
| 6,588,605 B1 * | 7/2003 | Volkert et al. | ............... | 211/41.14 |
| 7,338,024 B2 * | 3/2008 | Chen et al. | ............... | 248/345.1 |

* cited by examiner

*Primary Examiner*—Sarah Purol
(74) *Attorney, Agent, or Firm*—Nixon & Vanderhye P.C.

(57) ABSTRACT

A storage rack is provided for storing a plurality of articles such as glass sheets. The storage rack includes a substantially horizontal portion, and a substantially vertical portion. The substantially horizontal portion of the rack includes one or more flexible supports, each of which includes at least one channel defined therein. Along at least part of the channel, a plurality of slits are provided in the flexible support so as to define a plurality of flexible lips or tabs. The lips or tabs are designed so that when a glass sheets is inserted into the channel, the lips or tabs support the sheet against movement in multiple directions.

17 Claims, 3 Drawing Sheets

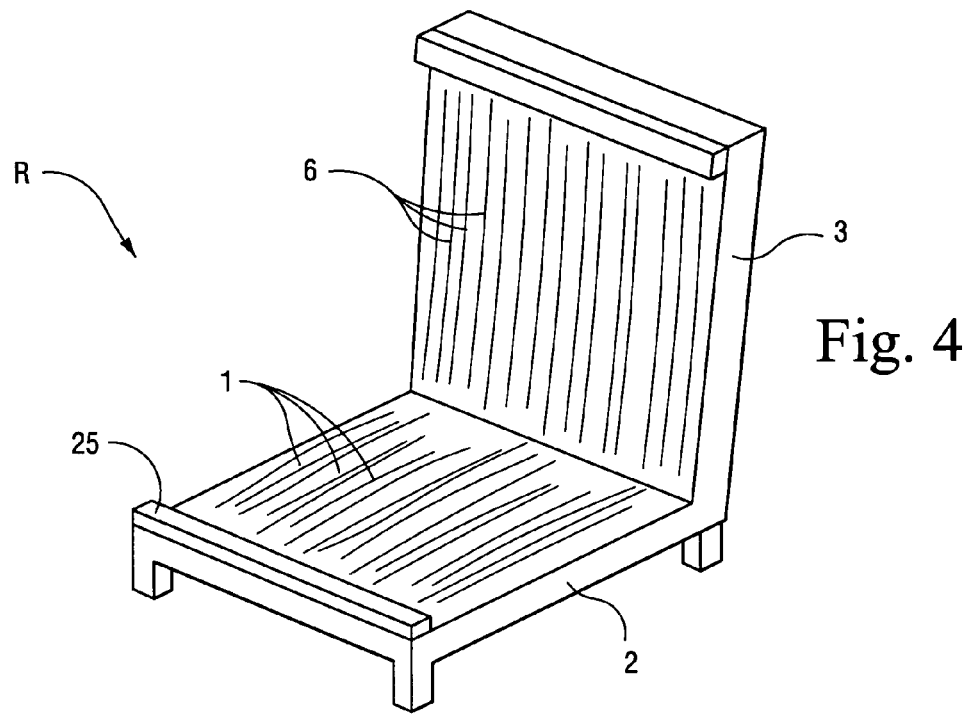
Fig. 4
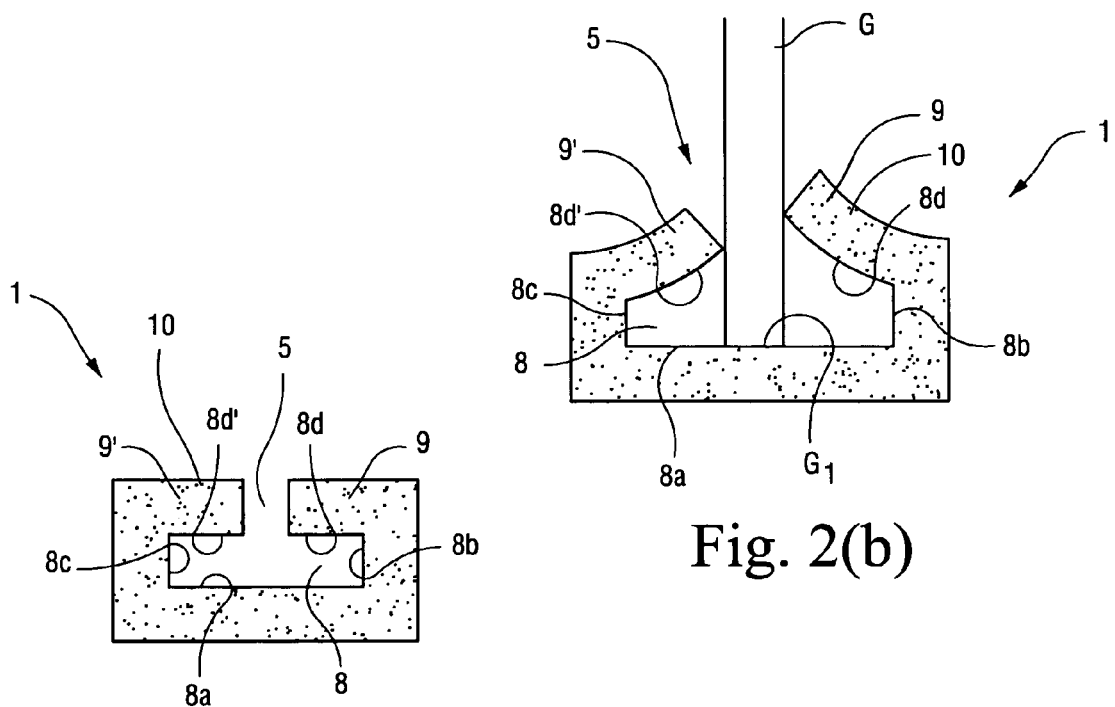
Fig. 2(b)
Fig. 2(a)

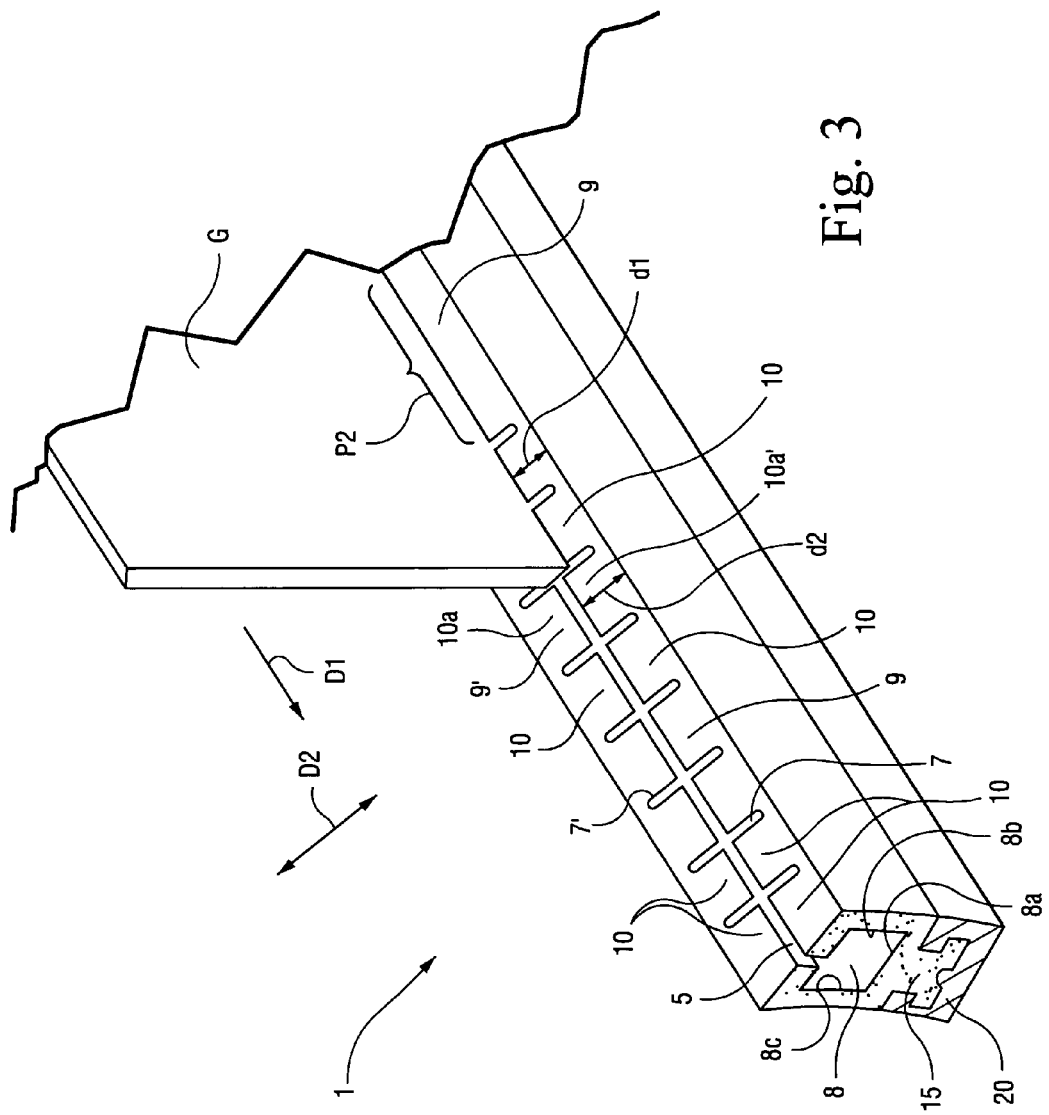

STORAGE RACK FOR GLASS SHEETS

This invention relates to a storage rack for storing one or more glass sheets, preferably in a substantially parallel manner in certain example embodiments.

BACKGROUND OF THE INVENTION

Storage systems for articles such as glass sheets are known in the art. For instance, harp racks are known and have a plurality of cords which serve to separate glass sheets in the rack. However, in the case of harp racks, the cords tend to contact the glass sheets (e.g., coated glass sheets) and may cause damage to the coating in certain situations. For instance, the coating can be damaged and rubbed off in certain locations where the cords contact the coating.

U.S. Pat. No. 6,102,206 discloses another type of glass storage rack. However, the rack of the '206 patent is disadvantageous in that it lacks in terms of efficient retention of glass sheets.

It will be apparent to those skilled in the art that there exists a need in the art for an improved system and apparatus for storing glass sheets such as coated glass sheets, uncoated glass sheets, IG window units, or the like.

BRIEF SUMMARY OF EXAMPLES OF THE INVENTION

In certain example embodiments of this invention, a storage rack is provided for storing glass sheets such as coated glass sheets (e.g., glass sheets with a low emissivity or other type of coating thereon), uncoated glass sheets, IG window units, or the like. The storage rack may be used in a given location for simply storing glass sheets in one or multiple locations, or alternatively may be used in transporting glass sheets.

In certain example embodiments, the storage rack includes a substantially horizontal portion (i.e., horizontal plus/minus about 20 degrees) and a substantially vertical portion (i.e., vertically oriented, plus/minus about 20 degrees). In certain example embodiments, the substantially horizontal portion is substantially perpendicular to the substantially vertical portion. The glass sheets are fit into respective supporting channels provided in the substantially horizontal portion and the substantially vertical portion. A plurality of channels may be provided in each of the substantially horizontal portion and the substantially vertical portion, so that a plurality of parallel-aligned glass sheets can be stored in the rack. For a given glass sheet (e.g., rectangular, including square, in shape), a bottom edge thereof is at least partially located in and supported by a channel defined in the substantially horizontal portion, and a side edge thereof is at least partially located in and supported by a channel defined in the substantially vertical portion.

The substantially horizontal portion of the rack includes one or more flexible supports made of a material such as rubber or the like. The flexible support includes an elongated channel defined therein into which glass sheets are fitted during storage. A plurality of slits are provided in the flexible support along a first portion of the channel, on one or both sides of the channel. The slits define a plurality of flexible lips or tabs. In particular, each flexible lip or tab is provided between a pair of slits. Along a second portion of the channel, no slits (or no slits of this type) are provided in the flexible support. The second portion having no such slits is typically located between the first portion having the slits and the substantially vertical portion of the rack.

For a given glass sheet, a bottom edge portion thereof is at least partially located in and supported by the channel defined in the substantially horizontal portion, and a side edge portion thereof is at least partially located in and supported by a channel defined in the substantially vertical portion of the rack. The bottom edge portion of the glass sheet is partially located in the first portion of the channel along which slits (and thus the flexible lips or tabs) are located, and partially located in a second portion of the channel having no such slits provided therealong. In the second portion of the channel, insertion of the glass sheet thereinto causes the flexible members along each side of the channel to bend outwardly thereby creating a biasing force of these members inwardly against the glass sheet which helps hold the glass sheet in place in the channel.

In the first portion of the channel along which the slits and flexible lips or tabs are provided, insertion of the glass sheet thereinto causes two things to occur. First, in the area of the first portion of the channel where the glass sheet is inserted, the insertion of the sheet causes the flexible lips or tabs along one or both sides of the channel to bend outwardly thereby creating a biasing force of these lips or tabs inwardly against the glass sheet which helps hold the glass sheet in place in the channel. Second, in the area of the first portion of the channel where the glass sheet is not inserted (e.g., in the portion furthest from the substantially vertical portion of the rack), the flexible lips or tabs are not bent outwardly and thus tend to stay in position in a manner which permits one or more of the non-bent lips or tabs to block movement of the glass sheet in a direction away from the substantially vertical portion of the rack. Thus, along the first portion of the channel where the slits are located, some of the flexible lips or tabs are bent by insertion of the glass sheet and provide a biasing force against the glass sheet which helps hold the glass sheet in place against lateral movement in first and second directions which are substantially parallel to a plane defined by the substantially vertical portion of the rack; and other(s) of the flexible lips or tabs are not bent and block the glass sheet against movement in a direction (which is substantially perpendicular to the first and second directions) away from the substantially vertical portion of the rack. In other words, the flexible lips or tabs serve to support the glass sheet(s) against movement in multiple directions which are substantially perpendicular to each other.

In certain example embodiments of this invention, there is provided an apparatus (e.g., rack) for holding a plurality of glass sheets, the apparatus comprising: at least one flexible support having an elongated channel defined therein, and wherein first and second flexible fingers are provided on opposite sides of the channel; a plurality of slits defined in the first and/or second flexible fingers adjacent the channel so that the slits have respective open end portions at the channel; and a plurality of flexible lips or tabs defined between respective pairs of the slits.

BRIEF DESCRIPTION OF THE DRAWINGS

FIG. 2(*a*) is a cross sectional view of the flexible support of FIG. 1, along either Section a-a' or b-b' shown in FIG. 1, when no glass sheet is located in the channel of the flexible support.

FIG. 2(b) is a cross sectional view of the flexible support of FIG. 1, along either Section a-a' or b-b' shown in FIG. 1, when a glass sheet is located in the channel of the flexible support.

FIG. 3 is a perspective view of the flexible support of FIGS. 1-2, with a glass sheet located in a channel thereof.

FIG. 4 is a perspective view of a storage rack according to an example embodiment of this invention, the rack including a plurality of parallel-aligned flexible supports of FIGS. 1-3 in the substantially horizontal portion of the rack (no glass sheets are shown in FIG. 4, for purposes of simplicity and understanding).

DETAILED DESCRIPTION OF EXAMPLE EMBODIMENTS OF THE INVENTION

Figure 1:
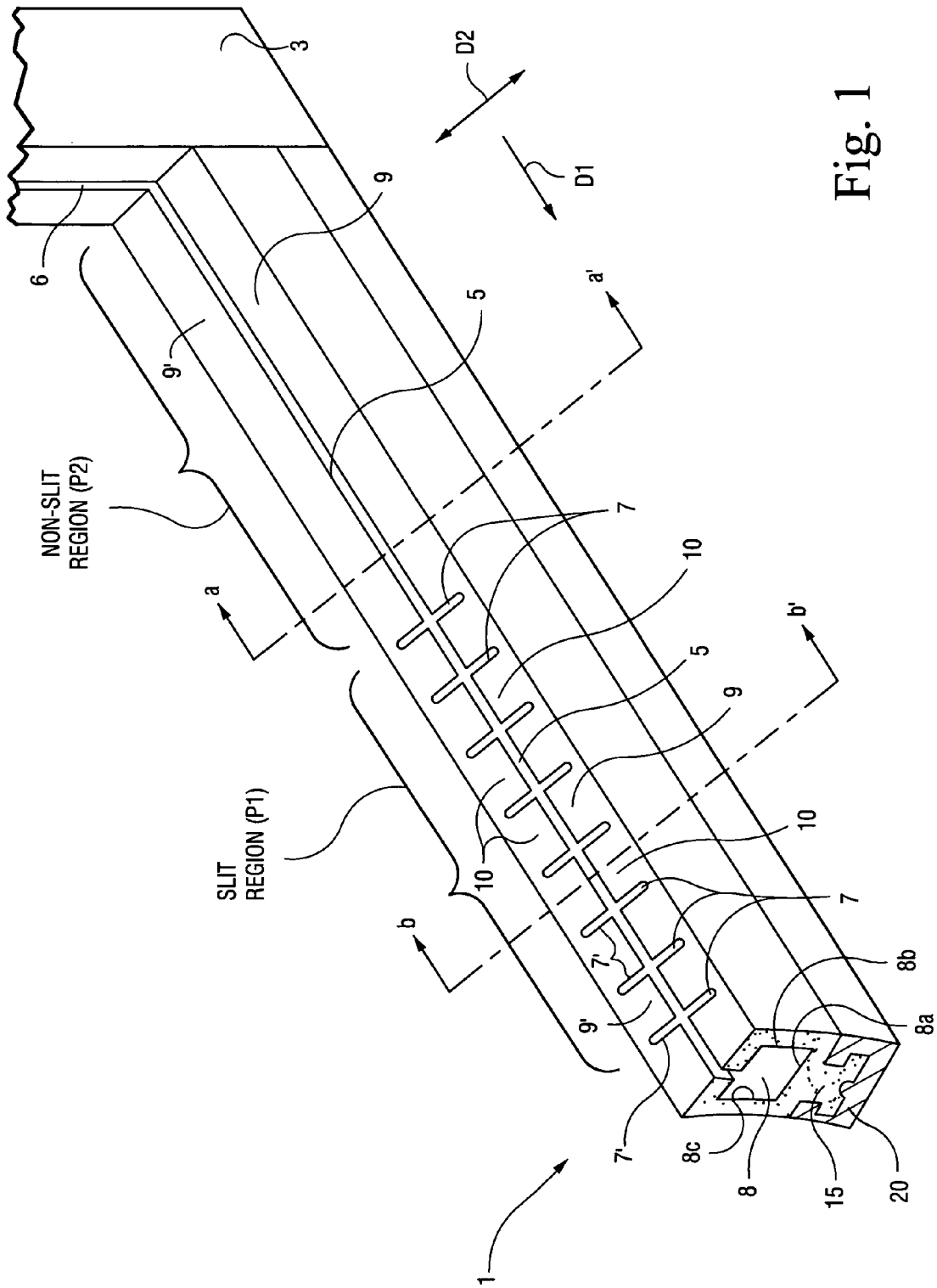
FIG. 1 is a perspective view of an example flexible support provided in the substantially horizontal portion of the rack according to an example embodiment of this invention; a plurality of parallel such flexible supports may be provided in the substantially horizontal portion of the rack in certain embodiments although only one is illustrated in FIG. 1 for purposes of simplicity and understanding.

Referring now more particularly to the figures in which like reference numerals indicate like parts throughout the several views.

In certain example embodiments of this invention, a storage rack is provided for storing glass sheets such as coated glass sheets (e.g., glass sheets with a low emissivity or other type of coating thereon), uncoated glass sheets, IG window units, or the like. The storage rack may be used in a given location for simply storing glass sheets in one or multiple locations, or alternatively may be used in transporting glass sheets. In certain example embodiments, a plurality of glass sheets may be aligned substantially parallel to one another in the storage rack. For example, and without limitation, coated or uncoated glass coming out of a tempering furnace may be positioned in the rack. The rack is designed so as to be able to accommodate glass sheets of many different sizes without adjustment.

FIG. 4 is a perspective view of a storage rack R according to an example embodiment of this invention. Rack R includes substantially horizontal portion 2 adapted to be located on the floor/ground, and a substantially vertical portion 3 which may be oriented in an upright position relative to the floor/ground. A plurality of parallel-aligned flexible supports 1 are provided as part of the substantially horizontal portion 2 of the rack. It is noted that no glass sheets are shown in FIG. 4, for purposes of simplicity and understanding. In certain example embodiments, when a plurality of parallel supports 1 are aligned in an abutting manner in portion 2 of the rack, the color of the supports 1 may alternate (e.g., black/white/black/white/black . . . ) across the width of the portion 2 of the rack, thereby enabling an operator to more easily align and fit a glass sheet G in the channel 5 in the horizontal portion 2 which corresponds to the channel 6 in the vertical portion 3 of the rack.

FIG. 1 is a perspective view of an example flexible support 1 provided in the substantially horizontal portion 2 of the rack according to an example embodiment of this invention. While a plurality of parallel such flexible supports 1 (e.g., made of extruded rubber) may be provided in the substantially horizontal portion 2 of the rack in certain embodiments (e.g., see FIG. 4), only one is illustrated in FIG. 1 for purposes of simplicity and understanding. FIG. 2(a) is a cross sectional view of the flexible support 1 along either Section a-a' or b-b' shown in FIG. 1, when no glass sheet is located in the channel 5 of the flexible support (the cross sectional view of both sections are similar); and FIG. 2(b) is a cross sectional view of the flexible support 1 along either Section a-a' or b-b' shown in FIG. 1, when a glass sheet G is located in the channel 5 of the flexible support. FIG. 3 is a perspective view of the flexible support 1 of FIGS. 1-2, with a glass sheet G located in channel 5 thereof.

Referring to FIGS. 1-4, in certain example embodiments, the storage rack R includes a substantially horizontal portion (i.e., horizontal plus/minus about 20 degrees) 2 and a substantially vertical portion (i.e., vertically oriented, plus/minus about 20 degrees) 3. In certain example embodiments, the substantially horizontal portion 2 is substantially perpendicular to the substantially vertical portion 3. The glass sheets G are fit into respective supporting channels 5 provided in the substantially horizontal portion 2 and channels 6 provided in the substantially vertical portion 3. A plurality of channels 5 may be provided in the substantially horizontal portion 2, and a plurality of corresponding channels 6 may be provided in the substantially vertical portion 3, so that a plurality of parallel-aligned glass sheets G can be stored in the rack R. For a given glass sheet (e.g., rectangular, octagonal, hexagonal, or the like in shape) G, a bottom edge portion thereof is at least partially located in and supported by a channel 5 defined in the substantially horizontal portion 2, and a side edge portion thereof is at least partially located in and supported by a channel 6 defined in the substantially vertical portion 3 (herein, "edge portion" means at or near the edge of the glass sheet). Typically, the bottom and side edges of the glass sheet G are substantially perpendicular to one another when the glass sheet G is rectangular in shape.

The substantially horizontal portion 2 of the rack R includes one or more horizontally aligned flexible supports 1 made of a flexible material such as rubber or the like. Typically, a plurality of such supports 1 are provide in a parallel relationship in making up the horizontal portion 2 of the rack. Each flexible support 1 includes an elongated channel 5 defined therein into which a glass sheet G is to be positioned during storage/transport. As best shown in FIGS. 1-3, each flexible support 1 includes an elongated hollow or cavity 8 defined under and along the length of the channel 5. The hollow or cavity 8 is defined by a bottom wall 8a, side walls 8b and 8c, and top walls 8d and 8d'. The side walls 8b and 8c are located between and connect the respective top walls 8d and 8d' to the bottom wall 8a. Side walls 8b and 8c of the cavity 8 are typically approximately perpendicular to walls 8a and 8d in certain example non-limiting embodiments of this invention.

Channel 5 is defined between a pair of flexible fingers 9 and 9'. The bottom side of each finger 9 is defined by a top wall (8d or 8d') of the cavity 8 in certain example embodiments of this invention. Channel 5 is also in communication with the cavity 8 as shown in FIGS. 1-3. A plurality of slits 7, 7' are provided in the fingers 9, 9' along a first portion (P1) of the channel 5, on one or both sides of the channel. While slits 7, 7' are typically provided along both sides of the channel 5 as shown in FIGS. 1-2, it is possible to eliminate the slits (7 or 7') along one side of the channel in certain alternative embodiments of this invention. The slits 7, 7' define a plurality of flexible lips or tabs 10. In particular, each flexible lip or tab 10 is provided between a pair of slits (7 or 7') in a finger 9, 9'. Along a second portion (P2) of the channel and thus in a second portion of the fingers 9, 9', no slits (or no slits of this type) 7, 7' are provided in the flexible support 1. The second portion (P2) having no such slits is typically located between the first portion (P1) having the slits 7, 7' and the substantially vertical portion 3 of the rack as best shown in FIG. 1. In certain example embodiments of this invention, adjacent slits 7 and/or 7' in a given finger 9 may be spaced apart from one another by about 0.10 to 0.75 inches, more preferably from about 0.2 to 0.5 inches, and most preferably about 0.25 inches. Moreover, the slits 7, 7' may be of any suitable shape in different embodiments of this invention. For example and without limitation, the slits may be linearly shaped, curved, non-linearly shaped, triangular-shaped, or the like in different example embodiments of this invention.

For a given glass sheet G, a bottom edge $G_1$ thereof is fitted into part of the channel 5 defined in the substantially horizontal portion 2. The bottom edge $G_1$ may move through the channel and come to rest on the bottom wall 8*a* of the cavity 8 as shown in FIG. 2(*b*), with a bottom edge portion of the glass sheet G still residing in and being supported by the channel 5. In a similar manner, a side edge portion of the glass sheet G is at least partially located in and supported by a channel 6 defined in the substantially vertical portion 3 of the rack. The bottom edge portion of the glass sheet G is partially located in the first portion (P1) of the channel 5 along which slits (7 and/or 7') (and thus the flexible lips or tabs 10) are located, and partially located in a second portion (P2) of the channel 5 having no such slits (7 and/or 7') provided therealong. In the second portion (P2) of the channel 5, insertion of the glass sheet G thereinto and the thickness of the inserted glass sheet G causes the flexible fingers 9 and 9' along each side of the channel 5 to bend outwardly thereby creating a biasing force of these fingers 9, 9' inwardly against the glass sheet which helps hold the glass sheet in place in the channel (e.g., see FIGS. 2(*b*) and 3).

In the first portion (P1) of the channel 5 along which the slits 7, 7' and flexible lips or tabs 10 are provided, insertion of the glass sheet G thereinto causes two things to occur. First, in the area of the first portion (P1) of the channel 5 where the glass sheet G is inserted, the insertion of the sheet G causes the flexible lips or tabs 10 along one or both sides of the channel 5 to bend outwardly thereby creating a biasing force of these lips or tabs 10 inwardly against the glass sheet G which helps hold the glass sheet in place in the channel (e.g., see FIGS. 2(*b*) and 3). Second, in the area of the first portion (P1) of the channel where the glass sheet is not inserted (e.g., in the portion of P1 furthest from the substantially vertical portion 3 of the rack R), the flexible lips or tabs 10 are not bent outwardly and thus tend to stay in position in a manner which permits one or more of the non-bent lips or tabs 10 to act as a stop(s) to block movement of the glass sheet G in a direction D1 away from the substantially vertical portion 3 of the rack. For example, as shown in FIG. 3, non-bent lips or tabs 10*a* and 10*a*' are in an area of P1 where the glass sheet G has not been inserted, and thus tend to stay in position in a manner which permits the non-bent lips or tabs 10*a* and 10*a*' to block movement of the glass sheet G in a direction D1 away from the substantially vertical portion 3 of the rack This is because if the glass sheet G starts to move in direction D1, the edge of the glass sheet will abut and come to rest against the surfaces of lips/tabs 10*a* and 10*a* which are closest to vertical portion 3 of the rack R.

Thus, along the first portion P1 of the channel 5 where the slits 7, 7' are located, some of the flexible lips or tabs 10 are bent by insertion of the glass sheet G and provide a biasing force against the glass sheet G which helps hold the glass sheet in place against lateral movement in first and second directions D2 (along with channel 6) which are substantially parallel to a plane defined by the substantially vertical portion 3 of the rack; and other(s) of the flexible lips or tabs (e.g., see 10*a* and 10' in FIG. 3) are not bent and block the glass sheet G against movement in a direction D1 (which is substantially perpendicular to the first and second directions D2) away from the substantially vertical portion 3 of the rack. In other words, the flexible lips or tabs 10 serve to support the glass sheet(s) against movement in multiple directions D1 and D2 which are substantially perpendicular to each other.

The length of the non-slit portion P2 may be about as long as the minimum length of glass sheet G to be positioned in the rack R in certain example embodiments of this invention (e.g., from about 10-24 inches, more preferably about 18 inches). Thus, when the smallest size glass sheet G is located in the channel 5, no lips or tabs 10 are bent by or contacted by the glass sheet G and thus the lips or tabs 10 closest to portion P2 can stop the glass sheet G from movement in direction D1. However, when a larger size glass sheet (e.g., 25 inches long glass sheet) is located in the channel it occupies most or all of portion P2 and some of portion P1 of the channel and thus bends some but not all of flexible lips or tabs 10. In this latter case, as shown in FIG. 3, the non-bent lips or tabs 10*a* and 10*a*' closest to the end of the sheet G can stop the glass sheet G from movement in direction D1. Accordingly, it will be appreciated that the rack R is designed so as to accommodate multiple sizes of glass sheet, without the need for adjustment when different sized glass sheets are inserted into or stored in the rack. However, in alternative embodiments of this invention, it is possible to provide slits 7 and/or 7' along the entire length of the channel 5 thereby eliminating non-slit portion P2.

As best shown in FIGS. 1 and 3, flexible supports 1 may be supported by a track or support 20 in certain example embodiments of this invention. In certain example embodiments, the track or support includes a cavity into which a key-like projection 15 of the support 1 fits in a sliding manner. In other words, the support 1 can be slidingly fitted to the track 20 in a key/keyway manner in certain example embodiments of this invention. This permits supports 1 to be easily replaced, removed, inserted, and/or repaired in an efficient manner. In certain example embodiments of this invention, the track or support 20 may be of any suitable material, such as aluminum or the like.

FIG. 4 illustrate that a retainer 25 may be provide at or near an end of the horizontal portion 2 of the rack furthest from the vertical portion 3 of the rack. Retainer 25 may be located over end portions of the array of flexible supports 1 as shown in FIG. 4, and the attachment of retainer 25 to the rack may help maintain the supports 1 in position on the rack. When it is desired to replace one or more supports 1, retainer 25 may be removed by a screw or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An apparatus for holding a plurality of glass sheets, the apparatus comprising:
    a substantially vertical portion and a substantially horizontal portion, wherein the substantially vertical portion is oriented approximately perpendicular to the substantially horizontal portion;
    wherein the substantially horizontal portion comprises at least one flexible support having an elongated channel defined therein, and wherein first and second flexible fingers are provided on opposite sides of the channel;
    a plurality of slits defined in the first and/or second flexible fingers adjacent the channel so that the slits have respective open end portions at the channel;
    a plurality of flexible lips or tabs defined between respective pairs of the slits; and
    wherein the elongated channel is defined along the length of a central portion of the flexible support, and the slits extend outwardly from the channel in a width direction of the flexible support so that an edge portion of a glass sheet is to be positioned so that the glass sheet fits in the channel and extends along a the length of a substantial portion of the flexible support and the slits extend outwardly away from the glass sheet.

2. The apparatus of claim 1, wherein the slits and flexible lips or tabs are shaped and oriented so that when a glass sheet is inserted into the channel a first number of the flexible lips or tabs is bent by the insertion of the glass sheet and a second number of the flexible lips or tabs is not bent by the insertion of the glass sheet, and wherein one or more of the second number of flexible lips or tabs acts as a stop to block the glass sheet from sliding in the channel in a direction away from the substantially vertical portion of the apparatus.

3. The apparatus of claim 2, wherein the first number is from 1 to 20, and the second number is from 1 to 50.

4. The apparatus of claim 3, wherein each of the first and second numbers is greater than 2.

5. The apparatus of claim 1, wherein a first portion of the channel has the slits defined in the first and/or second flexible fingers adjacent the channel, and a second portion of the channel, which is located closer to the substantially vertical portion than is the first portion of the channel, has no such slits defined in the flexible fingers adjacent the channel.

6. The apparatus of claim 1, wherein the flexible support is elongated in shape and is supported by a track, so that the flexible support is slidably removable from the track.

7. The apparatus of claim 1, wherein a plurality of the slits are parallel to one another.

8. The apparatus of claim 1, wherein a cavity is defined in the flexible support under the channel.

9. The apparatus of claim 8, wherein the cavity is defined by at least a bottom wall, first and second approximately parallel side walls, and first and second top walls.

10. The apparatus of claim 9, wherein the first and second top walls of the cavity define first and second bottom surfaces of the first and second flexible fingers, respectively.

11. The apparatus of claim 1, wherein the slits are defined in the first and second flexible fingers adjacent the channel on opposite sides of the channel.

12. The apparatus of claim 1, wherein the flexible lips or tabs each have a length of from about 0.10 to 0.75 inches.

13. The apparatus of claim 1, wherein the flexible lips or tabs each have a length of from about 0.2 to 0.5 inches.

14. The apparatus of claim 1, wherein a plurality of said flexible supports are provided as part of the substantially horizontal portion of the apparatus.

15. The apparatus of claim 14, wherein the plurality of flexible supports are aligned in a substantially parallel manner.

16. The apparatus of claim 15, wherein the plurality of flexible supports are provided in alternating colors across a width of the substantially horizontal portion.

17. The apparatus of claim 1, wherein another channel for receiving an edge portion of a glass sheet is provided in the substantially vertical portion of the apparatus, so that a given glass sheet fits into both (a) the channel in the substantially vertical portion, and (b) the channel in the flexible support.

* * * * *